United States Patent
Zhu et al.

(10) Patent No.: US 11,615,295 B2
(45) Date of Patent: Mar. 28, 2023

(54) DISTRIBUTED AI TRAINING TOPOLOGY BASED ON FLEXIBLE CABLE CONNECTION

(71) Applicants: Baidu USA LLC, Sunnyvale, CA (US); Baidu.com Times Technology (Beijing) Co., Ltd., Beijing (CN)

(72) Inventors: Hefei Zhu, Sunnyvale, CA (US); Jian Ouyang, Beijing (CN); Zhibiao Zhao, Cupertino, CA (US); Xiaozhang Gong, Shanghai (CN); Qingshu Chen, Shanghai (CN)

(73) Assignees: BAIDU USA LLC, Sunnyvale, CA (US); BAIDU.COM TIMES TECHNOLOGY (BEIJING) CO., LTD., Beijing (CN); KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 539 days.

(21) Appl. No.: 16/622,789

(22) PCT Filed: Nov. 15, 2019

(86) PCT No.: PCT/CN2019/118752
§ 371 (c)(1),
(2) Date: Dec. 13, 2019

(87) PCT Pub. No.: WO2021/092890
PCT Pub. Date: May 20, 2021

(65) Prior Publication Data
US 2021/0174174 A1    Jun. 10, 2021

(51) Int. Cl.
*G06F 15/80*    (2006.01)
*G06N 3/063*    (2023.01)
(Continued)

(52) U.S. Cl.
CPC .......... *G06N 3/063* (2013.01); *G06F 9/5027* (2013.01); *G06F 13/36* (2013.01); *G06F 15/80* (2013.01)

(58) Field of Classification Search
None
See application file for complete search history.

(56) References Cited

U.S. PATENT DOCUMENTS 8,155,022 B1    4/2012  Ainsworth
9,037,770 B2 *  5/2015  Biran ............... G06F 13/36
                                                710/313
(Continued)

FOREIGN PATENT DOCUMENTS

CN    110222005    9/2019
CN    110347636    10/2019
(Continued)

OTHER PUBLICATIONS

Gibiansky, Andrew: "Bringing HPC Techniques to Deep Learning—Andrew Gibiansky", • Feb. 21, 2017 (Feb. 21, 2017), 24 pages.
(Continued)

*Primary Examiner* — Michael Sun
(74) *Attorney, Agent, or Firm* — Womble Bond Dickinson (US) LLP (57) ABSTRACT

A data processing system includes a central processing unit (CPU) and accelerator cards coupled to the CPU over a bus, each of the accelerator cards having a plurality of data processing (DP) accelerators to receive DP tasks from the CPU and to perform the received DP tasks. At least two of the accelerator cards are coupled to each other via an inter-card connection, and at least two of the DP accelerators are coupled to each other via an inter-chip connection. Each of the inter-card connection and the inter-chip connection is capable of being dynamically activated or deactivated, such that in response to a request received from the CPU, any one
(Continued)

of the accelerator cards or any one of the DP accelerators within any one of the accelerator cards can be enabled or disabled to process any one of the DP tasks received from the CPU.

20 Claims, 9 Drawing Sheets

(51) Int. Cl.
*G06F 13/36* (2006.01)
*G06F 9/50* (2006.01)

(56) References Cited

U.S. PATENT DOCUMENTS

| | | | |
|---|---|---|---|
| 2010/0007668 A1* | 1/2010 | Casparian | G09G 5/006 |
| | | | 345/520 |
| 2010/0078781 A1 | 4/2010 | Ganesan et al. | |
| 2016/0379115 A1 | 12/2016 | Burger et al. | |
| 2017/0322899 A1 | 11/2017 | Ni et al. | |
| 2018/0157465 A1 | 6/2018 | Bittner et al. | |
| 2019/0042515 A1* | 2/2019 | Guim Bernat | G06F 9/54 |
| 2019/0138474 A1 | 5/2019 | Fong et al. | |
| 2019/0205745 A1 | 7/2019 | Sridharan et al. | |
| 2019/0297015 A1* | 9/2019 | Marolia | H04L 45/742 |
| 2019/0312772 A1* | 10/2019 | Zhao | H04L 41/12 |
| 2019/0339981 A1 | 11/2019 | Sity et al. | |
| 2020/0081850 A1* | 3/2020 | Singh | G06F 13/1673 |

FOREIGN PATENT DOCUMENTS

| | | |
|---|---|---|
| EP | 3399471 | 11/2018 |
| JP | 60-140457 A | 7/1985 |
| JP | 61-156363 A | 7/1986 |
| JP | 2001-185648 A | 7/2001 |
| JP | 2005-524239 A | 8/2005 |
| JP | 2012-503887 A | 2/2012 |

OTHER PUBLICATIONS

David Koenen, Arm, "Cache Coherent Interface for Accelerators (CCIX)," SNIA Persistent Memory PM Summit, Jan. 24, 2018, San Jose, CA, 24 pages.

* cited by examiner

FIG. 2D
Allgather Data Transfer in the First Iteration

FIG. 2E
Allgather Data Transfer in the Second Iteration

FIG. 2F
Final State After Allgather Transfers

DISTRIBUTED AI TRAINING TOPOLOGY BASED ON FLEXIBLE CABLE CONNECTION

CROSS-REFERENCE TO RELATED APPLICATION

This patent application is a U.S. National Phase Application under 35 U.S.C. § 371 of International Application No. PCT/CN2019/118752, filed Nov. 15, 2019, entitled "DISTRIBUTED AI TRAINING TOPOLOGY BASED ON FLEXIBLE CABLE CONNECTION," which is incorporated by reference herein by its entirety.

TECHNICAL FIELD

Embodiments of the present disclosure relate generally to machine learning. More particularly, embodiments of the disclosure relate to artificial intelligence (AI) accelerator chip topologies.

BACKGROUND

Distributed AI training requires multiple AI accelerator chips working simultaneously to speed up the entire training process and reduce training time. Accordingly, topologies of AI accelerator chips are needed to coordinate the chips. The sizes of such topologies can vary from a single-digit number to thousands of AI accelerator chips, depending on the training needs. Typically, a small topology can be built using printed circuit board (PCB) wires on a base board; and a large topology can be built using Ethernet to connect different base boards. However, neither approach is deal, because they are either clumsy or requiring substantial hardware overhead.

SUMMARY

According to a first aspect, some embodiments of the present disclosure provides a data processing system, including: a central processing unit (CPU); and a plurality of accelerator cards coupled to the CPU over a bus, each of the accelerator cards having a plurality of data processing (DP) accelerators to receive DP tasks from the CPU and to perform the received DP tasks, wherein at least two of the accelerator cards are coupled to each other via an inter-card connection, wherein at least two of the DP accelerators are coupled to each other via an inter-chip connection, wherein each of the inter-card connection and the inter-chip connection is capable of being dynamically activated or deactivated, such that in response to a request received from the CPU, any one of the accelerator cards or any one of the DP accelerators within any one of the accelerator cards can be enabled or disabled to process any one of the DP tasks received from the CPU.

According to a second aspect, some embodiments of the present disclosure provides an accelerator card, including: a host interface to be coupled to a central processing unit (CPU) over a bus; and a plurality of data processing (DP) accelerators to receive DP tasks from the CPU and to perform the received DP tasks, wherein at least two of the DP accelerators are coupled to each other via an inter-chip connection, where each inter-chip connection is capable of being dynamically activated or deactivated, such that in response to a request received from the CPU via the host interface, any one of the DP accelerators can be enabled or disabled to process any one of the DP tasks received from the CPU.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In this disclosure, the terms of AI accelerator, AI accelerator chip, and chip are used interchangeably, and each of them is an example of a general processing unit (GPU), which is an example of a data processing (DP) accelerator.

According to one aspect, a data processing system includes a central processing unit (CPU) and accelerator cards coupled to the CPU over a bus, each of the accelerator cards having a plurality of data processing (DP) accelerators to receive DP tasks from the CPU and to perform the received DP tasks. At least two of the accelerator cards are coupled to each other via an inter-card connection, and at least two of the DP accelerators are coupled to each other via an inter-chip connection. Each of the inter-card connection and the inter-chip connection is capable of being dynamically activated or deactivated, such that in response to a request received from the CPU, any one of the accelerator cards or any one of the DP accelerators within any one of the accelerator cards can be enabled or disabled to process any one of the DP tasks received from the CPU.

According to another aspect, an accelerator card includes a host interface to be coupled to a central processing unit (CPU) over a bus and a plurality of data processing (DP) accelerators to receive DP tasks from the CPU and to perform the received DP tasks. At least two of the DP accelerators are coupled to each other via an inter-chip connection. Each inter-chip connection is capable of being dynamically activated or deactivated, such that in response to a request received from the CPU via the host interface, any one of the DP accelerators can be enabled or disabled to process any one of the DP tasks received from the CPU.

According to various embodiments, systems and methods for dynamically creating AI chip topologies are described. AI topologies of different sizes can be built by dynamically activating or deactivating cable connections (also referred to as inter-chip or inter-processor connections) between base boards (also referred to as accelerator cards or accelerator modules) in an AI chip cluster. The chip cluster can include a large number of AI chips on different base boards. Each base board can include an equal number of AI chips that are interconnected using printed circuit board (PCB) wires or electrical traces.

According to an exemplary method, a request is received for creating a chip topology in a chip cluster, the request specifying a number of chips for the chip topology. The chip cluster includes a large number of base boards connected with each other using cable connections, with each base board including a set of chips thereon. In response to the request, a set of base boards is determined for the chip topology, based on the number of chips specified for the topology and a number of the set of chips on each base board. Once the set of base boards are determined, cable connections among the set of base boards are checked to determine if any cable connections is in a deactivated state. The deactivated cable connection is then activated to construct the requested chip topology.

In one embodiment, each chip can be configured to execute one or more program instructions (commands or signals) to activate or deactivate an inter-chip connection to the chip. In one embodiment, each chip is an AI accelerator chip. The set of chips on each base board are arranged in a number of rows, with each row including an equal number of chips, with each chip connecting to its neighboring chips using bi-directional printed circuit board (PCB) wires.

In one embodiment, the chip topology includes multiple rows and multiple columns of chips, with chips in each row or each column being connected in a daisy-chain fashion to form a bidirectional physical ring. For each physical ring, chips on both ends of each row or each column are connected to each other using a cable connection. A cable connection can be a Cache Coherent Interconnect for Accelerators (CCIX) connection.

In one embodiment, each board can include an even number of chips arranged in two rows. The chips on the ends of each row can have two or more two chip-to-chip cable interfaces, whereas the other chips can have one or more chip-to-chip cable interface. Each chip has at least one chip-to-chip cable or PCB wire interface on each side of the chip.

Figure 1:
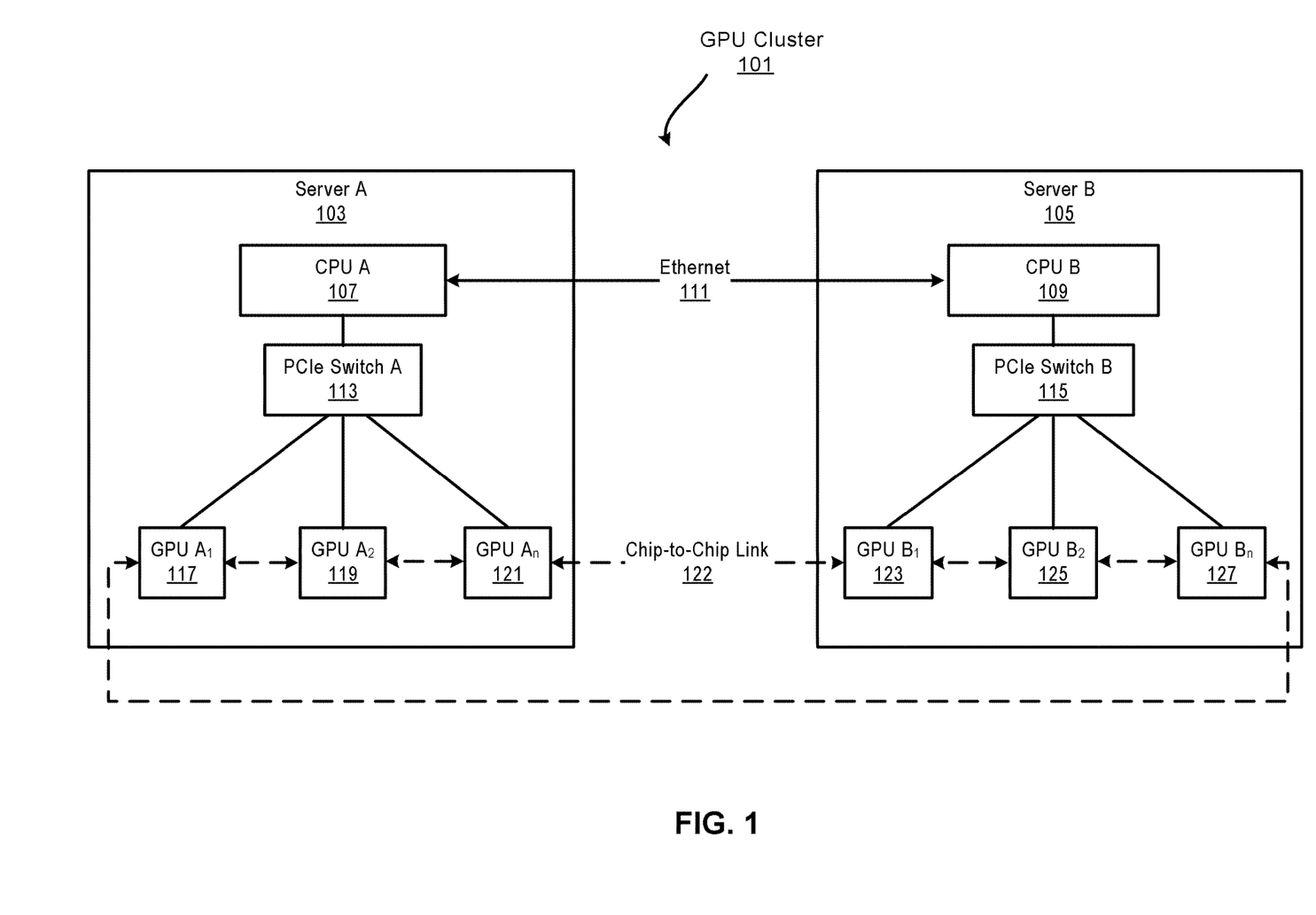
FIG. 1 illustrates an example of a system for use in AI model training in accordance with an embodiment.

FIG. 1 illustrates an example of a system for use in AI model training in accordance with an embodiment. As shown in FIG. 1, the system includes a cluster of general processing units (GPUs) 101 scattered in a number of servers, for example, server A 103 and server B 105, where each server includes one or more CPUs and each CPU is associated with one or more data processing (DP) accelerators such as GPUs.

The servers can include CPUs 107 and 109 that communicate with each other via an Ethernet connection 111. In the example system as shown in FIG. 1, each CPU can have a number of GPUs connected to the CPU via a PCIe (peripheral component interconnect express) switch. For example, in server A 103, the GPUs 117, 119 and 121 are connected to CPU A 107 via PCIe switch A 113; in server B 105, the GPUs 123, 125 and 127 are connected to s CPU B 109 via PCIe B 115.

The CPUs 107 and 109 can communicate with each other via an inter-processor link such as the Ethernet connection 111 to coordinate the task of training a neural network. For example, job commands can be distributed to each server via the Ethernet connection 111. A job command can then be dispatched from the CPU in the server to the GPUs connected to that CPU. Once the job command is dispatched, data among the GPUs in the system can be transferred via a respective chip-to-chip link 122. The chip-to-chip link 122 can be one of a variety of chip-to-chip interconnect solutions, for example, a Cache Coherent Interconnect for Accelerators (CCIX) compatible connection. As shown in FIG. 1, the GPUs in the system are arranged in a bi-directional ring topology although a uni-directional ring topology can be used.

CCIX is an open cache coherent interconnect architecture developed by the CCIX Consortium. CCIX is designed to simplify the communication between the central processor (e.g., CPU) and the various accelerators (e.g., GPU) in the system through a cache-coherent extension to standard PCIe. CCIX is a high-performance, chip-to-chip interconnect architecture that provides a cache coherent framework for heterogeneous system architectures. Cache coherency is automatically maintained at all time between the central processing unit and the various other accelerators in the system. Every CCIX-support device incorporates at least a single CCIX port which is pin-compatible with any other CCIX-enabled device. CCIX supports a large set of topologies such as chip-to-chip, chip-switch-chip, mesh, daisy chains, and rings.

In one embodiment, the GPUs are configured to perform AI training operations on data blocks distributed from their respective CPUs in a pipelined manner. Each of the GPUs also communicates with each other via an inter-processor link. The GPUs may be configured in a ring arrangement to receive a processing result of an upstream GPU for further data processing. Each GPU may further send a processing result to its corresponding downstream GPU to be further processed therein. Thus, each of the GPUs performs its assigned DP operation in parallel and sends its DP result to a downstream GPU. Meanwhile, each GPU further receives a processing result from its upstream GPU for further processing therein.

FIGS. 2A-2F illustrate an example process of data transfer in AI model training in accordance with an embodiment. Although three GPUs 203, 205 and 207 are shown herein, the example process can use as many as GPUs (e.g., thousands of GPUs) depending on a number of factors, for example, the complexity of the neural network to be trained, the size of the training data and the desired training speed of the user.

Examples of neural networks that can be trained on the example system include a multilayer perceptron (MLP) neural network, which includes a collection of connected neurons. The neurons in the MLP neural network can be fully connected, with each neuron in one layer connecting with parameters (e.g., weights and biases) to every neuron in the following layer.

During the training of a neural network model, gradient descent (i.e. backpropagation) can be used to determine a set of parameters that minimize the difference between expected values and actual output of the neural network model. The gradient descent includes the steps of calculating gradients of the loss/error function, and updating existing parameters in response to the gradients. The cycle can be repeated until the minima of the loss function are reached.

In one embodiment, a training dataset for the neutral network model can be divided into multiple of subsets, with each subset used for training the neural network model on one of the GPUs, such that the training of the neural network can be conducted in parallel by the multiple GPUs. Each GPUs can have a complete copy of the neural network model.

Each subset of the training dataset can be logically divided into multiple of equal-sized chunks of data. The number of the chunks may be equal to the number of the GPUs in the example process. The parallelizing training of the neural network model need multiple iterations for the gradient descent. For each iteration, every GPU runs forward propagation of the neural network model on the data on that GPU, followed by error backpropagation to compute the gradient of the loss with respect to the network parameters. The GPUs can subsequently communicate with each other to compute a statistic of the gradients (e.g., average, a maximum or a minimum), and apply the statistic (e.g. an average gradient) to obtain updated parameters. The neural network model may have a large number of parameters (e.g., billions of parameters) and each parameter may be associated with a gradient value. As such, the size of the gradients can be huge for the neural network, and transferring the gradients between the GPUs can take a tremendous amount of bandwidth.

Referring back to FIGS. 2A-2F, the example process illustrates an algorithm for reducing bandwidth requirement for data transfer among the GPUs. In one embodiment, bandwidth as used herein is the maximum rate of data transfer across a given network connection. The algorithm can include two processes. The first process is a Scatter-Reduce process and the second process is an Allgather process. During the Scatter-Produce process, the GPUs can exchange data such that every GPU ends up with a chunk of the final result. During the Allgather process, the GPUs can exchange those chunks such that all GPUs end up with the complete final result.

Each GPU can include one or more applications configured to partition the subset of training dataset on that GPU into the equal-sized data chunks; the number of the data chunks on each GPU is the number of the GPUs in the example system. Each data chunks can generate its own set of gradients during the training of the neural network model.

In this example, as shown above, since there are three GPUs in the system, and accordingly, the number of data chunks on each GPU is three. From the subset of the training data on GPU #0 203, three sets of gradients $a_0$ 215, $b_0$ 231, $c_0$ 237 can be generated; from the subset of the training data on GPU #1 205, three sets of gradients $a_1$ 217, $b_1$ 233, $c_1$ 239 are also generated. Similarly, from the subset of the training data on GPU #2 207, three sets of gradients $a_2$ 219, $b_2$ 235, $c_2$ 241 are generated. In one embodiment, the different sets of gradients on each GPU can be stored in an array or another data structure.

As an illustration, the algorithm is designed to sum up the gradients generated by each subset of the training dataset, such that upon the completion of the algorithm each GPU will have the sums of the gradients generated from the training dataset.

Figure 2A:
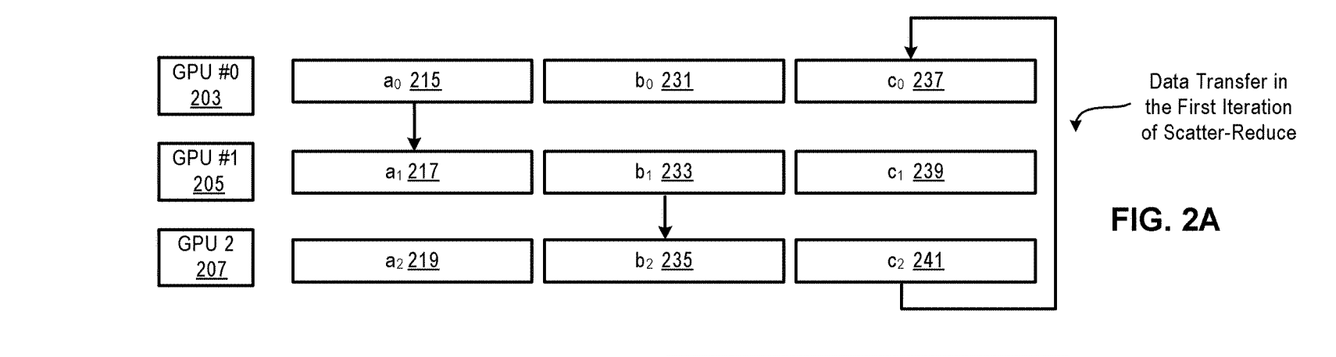
FIGS. 2A-2F illustrate an example process of data transfer in AI model training in accordance with an embodiment.
Figure 2B:
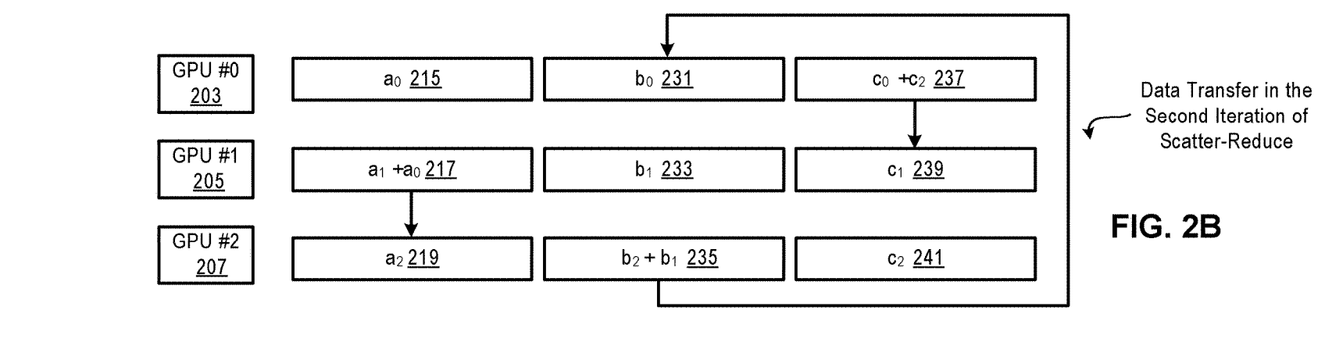
Figure 2C:
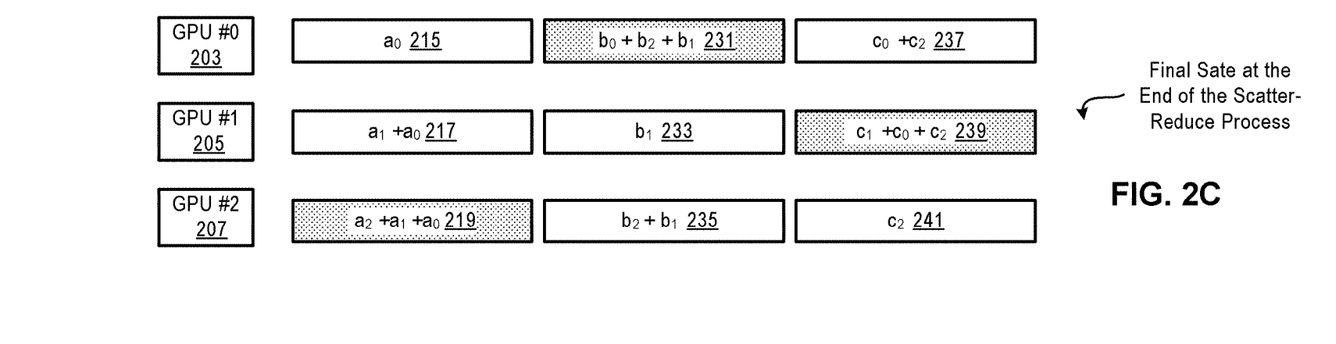

The GPUs in the example process can have a N−1 iterations during the Scatter-Reduce process, where N is the total number of GPUs in the system. As such, the GPUs in the example system can have 2 iterations. In each iteration, each GPU can send a set of gradients on the GPU to its right neighbor, receive a set of gradients from its left neighbor, and add up the two sets of gradients to generate a new set of gradients. The set of gradients being sent and received by every GPU is different for each iteration; the nth GPU starts by sending the nth set of gradients, and receives the (n−1)th set of gradients, and then proceeds backwards from there.

FIGS. 2A-2C illustrate the Scatter-Reduce process. FIG. 2A illustrates data transfer in the first iteration of the Scatter-Reduce process. After the first send and receive is completed, each GPU will have an array element with a value representing the sum of two sets of gradients on two different GPUs. For example, the first element $a_1$ on the GPU 205 can include the sum of the sets of gradients from the second GPU 205 and the first GPU 215. FIG. 2B illustrates data transfer in the second iteration of the Scatter-Reduce process, and also shows the intermediate sums after the first iteration of the Scatter-Reduce process is complete. In the second iteration, the Scatter-Reduce process continues, and by the end of the Scatter-Reduce process (namely after the second iteration in this example), each GPU will have one array element that contains the sum of all gradients in corresponding array elements across all the GPUs. FIG. 2C illustrates a final state at the end of the Scatter-Reduce process.

Figure 2D:
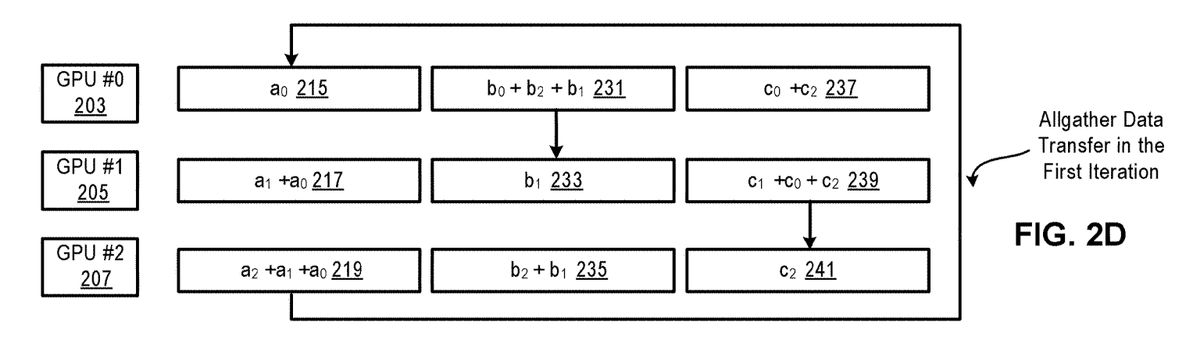
Figure 2E:
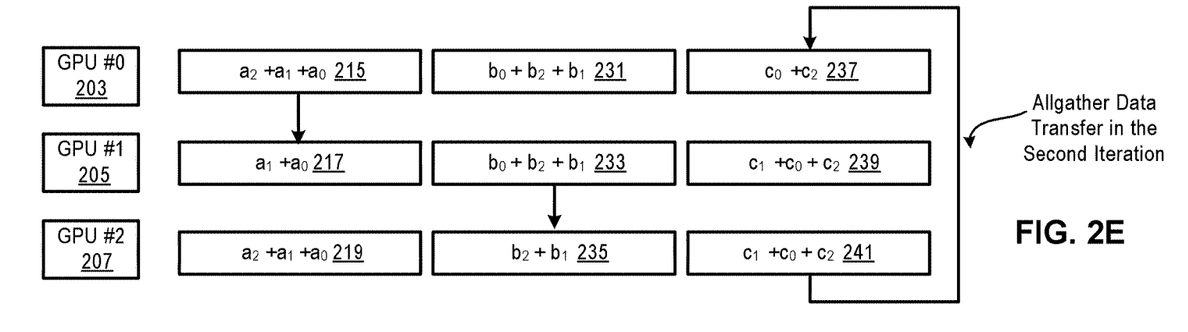
Figure 2F:
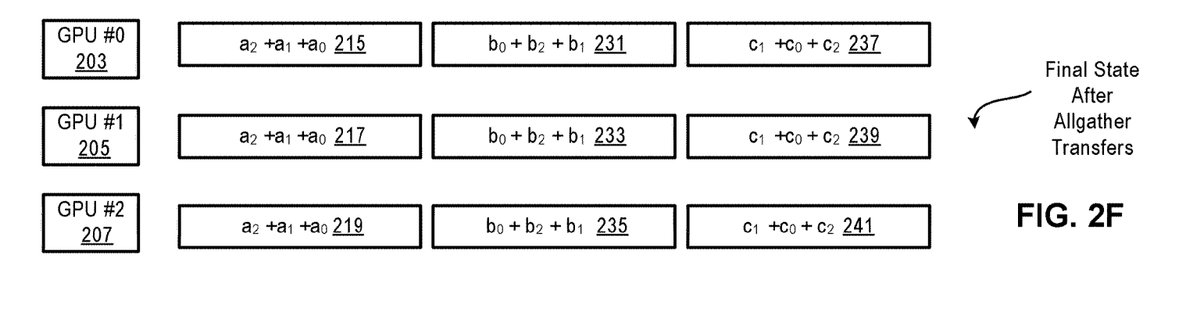

FIGS. 2D-2F illustrate the Allgather process, which proceeds identically to the Scatter-Reduce and also have N−1 iterations, except instead of accumulating gradients that the GPUs receive, the received gradients overwrite the gradients in a corresponding array element on the receiving GPU. FIG. 2D illustrates data transfer in the first iteration of the Allgather process. After the first iteration is completed, each GPU will have two array elements that each contains the sum of all gradients in corresponding array elements across all the GPUs, as shown in FIG. 2E. FIG. 2E shows the Allgather process in the second iteration, namely, the final iterations in the example process. By the end of the Allgather process as shown in FIG. 2F, GPU will have the fully accumulated gradients from the entire training dataset. Since all the data transfers occur synchronously in discrete iterations, the example process is bandwidth-optimal.

Figure 3:
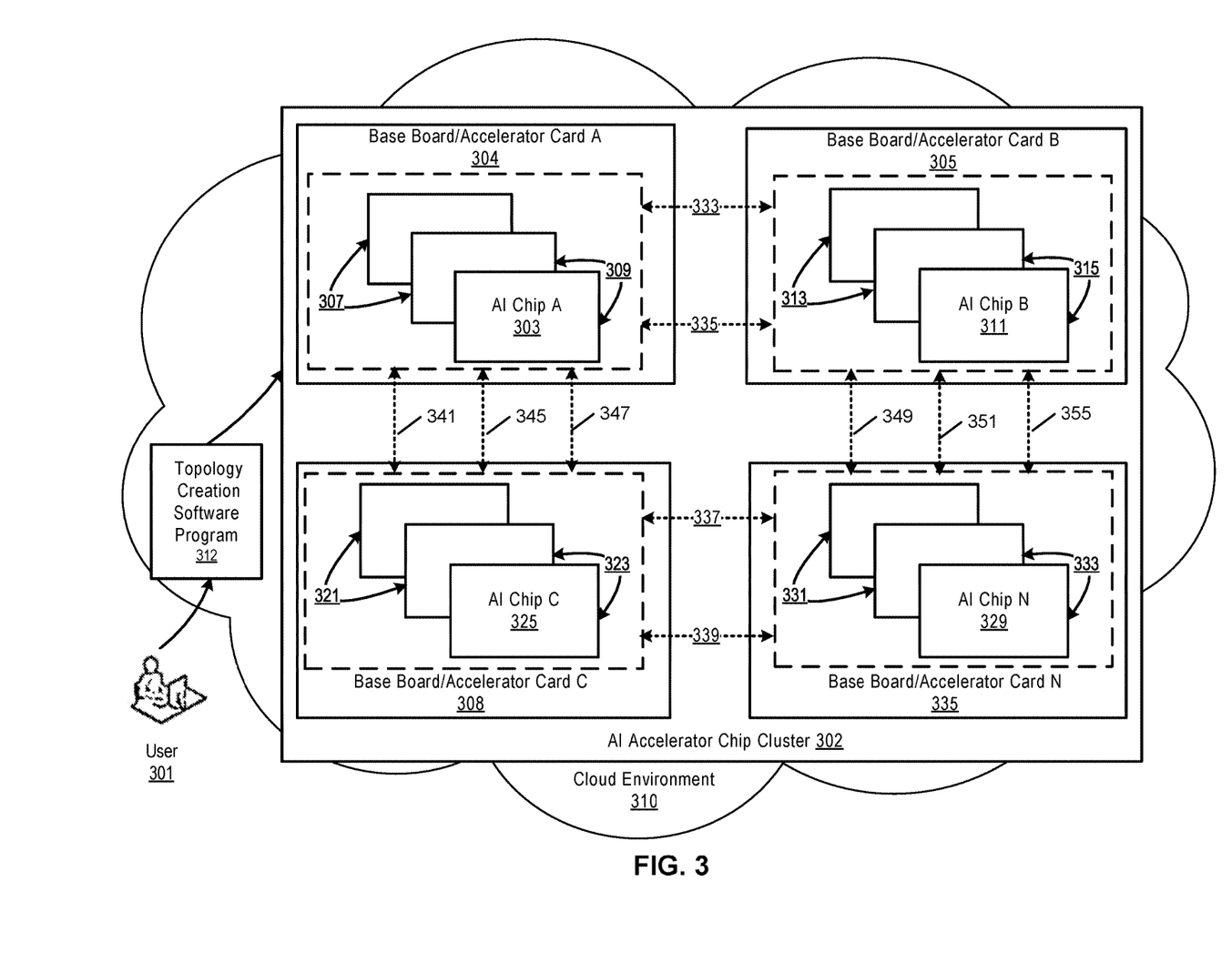
FIG. 3 illustrates an example system for creating AI chip topologies in accordance with an embodiment.

FIG. 3 illustrates an example system for creating AI chip topologies in accordance with an embodiment. As shown in FIG. 1, an AI accelerator chip cluster 302 can be provided in a cloud environment 310. The AI chip cluster 302 can include a large number of PCB base boards, for example, base board A 304, base board B 305, base board C 308, and base board N 335. Although only four base boards are shown in this figure, the AI chip cluster 302 can include any number of PCB base boards.

Each of the PCB boards in the chip cluster 302 includes the same number of AI chips. The figure shows an example of an AI chip on each base board, for example, AI chip A 303 on base board A 304, AI chip B 311 on base board B 305, AI chip C 325 on base board C 308, and AI chip N 329 on base board N 335. Chips on each PCB board have the same layout, and are connected to each other using PCB wires 307, 309, 313, 315, 321, 323, 331, and 333.

For example, each PCB board can include an even number (e.g., eight) of AI chips that are arranged in two rows.

Each row of AI chips can be connected sequentially using PCB wires, and each AI chip on one row is connected to a corresponding AI chip on the other row.

The PCB base boards in the AI chip cluster 302 can be connected to each other via cable connections, which can be in a deactivated state initially. The endpoints for each cable connection are AI chips on corresponding PCB base boards, rather than the corresponding boards themselves. Each AI chip can have a number of interconnect interfaces, each of which can be used for either a cable connection or a PCB wire connection. However, each AI chip may have at least one interconnect interface for a cable connection, which is used to connect to an AI chip on another PCB base board.

In one embodiment, the number of cable connections 333, 335, 337 and 339 between any two PCB base boards horizontal to each other can be the same as the number of rows of AI chips on a PCB base board, whereas the number of cable connections 341, 345, 347, 349, 351, and 353 between any two PCB base boards vertical to each other are equal to the number of columns of AI chips on an PCB base board.

Each PCB wire between AI chips are hardwired and cannot be dynamically disconnected. However, each cable connection (e.g., CCIX connection) between PCB base boards can be programmatically disconnected or reconnected. The disconnecting or reconnecting of a cable connection can be performed by one or more program instructions executed on one or more PCB base boards associated with the cable connection.

In FIG. 3, a user 301 can send a request to the AI accelerator chip cluster 310 for creating an AI chip topology with a predefined number of AI chips. The cloud environment 310 can be provided as a Platform as a Service (PaaS) to multiple tenants. The user 301 can be one of the tenants.

The request can be received by a topology creation software program 312 executing on one or more cloud servers. The topology creation logic 312 can implement a predetermined algorithm to convert information in the request to a set of program instructions for execution by one or more PCB base boards in the AI accelerator chip cluster 302. The topology creation software program 312 can keep track of the status of each PCB base board in the AI accelerator chip cluster 302, including whether that PCB base board is idle or busy. When an PCB base board is in an idle state, the PCB base board is not being used by a tenant. The topology creation logic 312 can also implement a set of rules to determine how to select one or more PCB base boards to satisfy an incoming topology creation request.

For example, the topology creation software program 312 can scan the AI accelerator cluster 302 and mark any idle PCB base boards for use in creating the requested AI chip topology. Alternatively, the topology creation software program 312 may also wait on one or more PCB base boards, if the time left for the PCB base boards to become available is within a predetermined range, and the PCB base boards are in a position closer to a PCB base board that has been selected for inclusion in creating the requested topology.

As an illustrative example, if the user 301 requests the creation of a topology with 32-chip topology, the topology creation software program 312 may create the topology in a number of different ways. The topology can include base board A 304 and base board B 305; base board C 308 and base board N 335; base board A 304 and base board C 308; and base board B 305 and base board N 335. The topology creation software program 312 can select any of the four options depending the predetermined algorithm and/or rules used for selecting PCB base boards in creating the requested topology.

Figure 4:
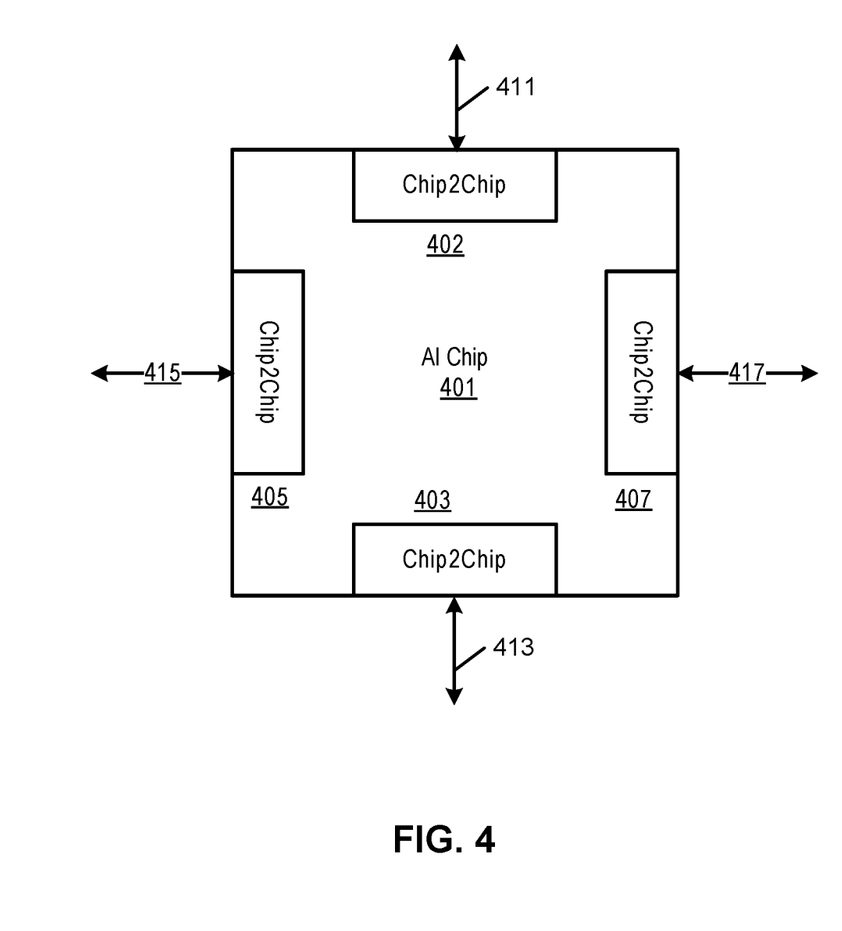
FIG. 4 illustrates an example AI chip in accordance with an embodiment.

FIG. 4 illustrates an example AI chip in accordance with an embodiment. As shown in FIG. 4, an AI chip 401 can include four chip-to-chip interconnect interfaces 402, 403, 405 and 407. In one embodiment, the AI chip 401 can have more than four interconnect interfaces.

Each chip-to-chip interconnect interface can be any industry standard interface, such as PCIe, CCIX or Interlaken. An interconnect bus 411, 415, 513 or 417 can be used with each interconnect interface. Each of the interconnect buses can be either as cable or as a PCB wire, and data transfer on each interconnect bus can be unidirectional or bidirectional.

Figure 5:
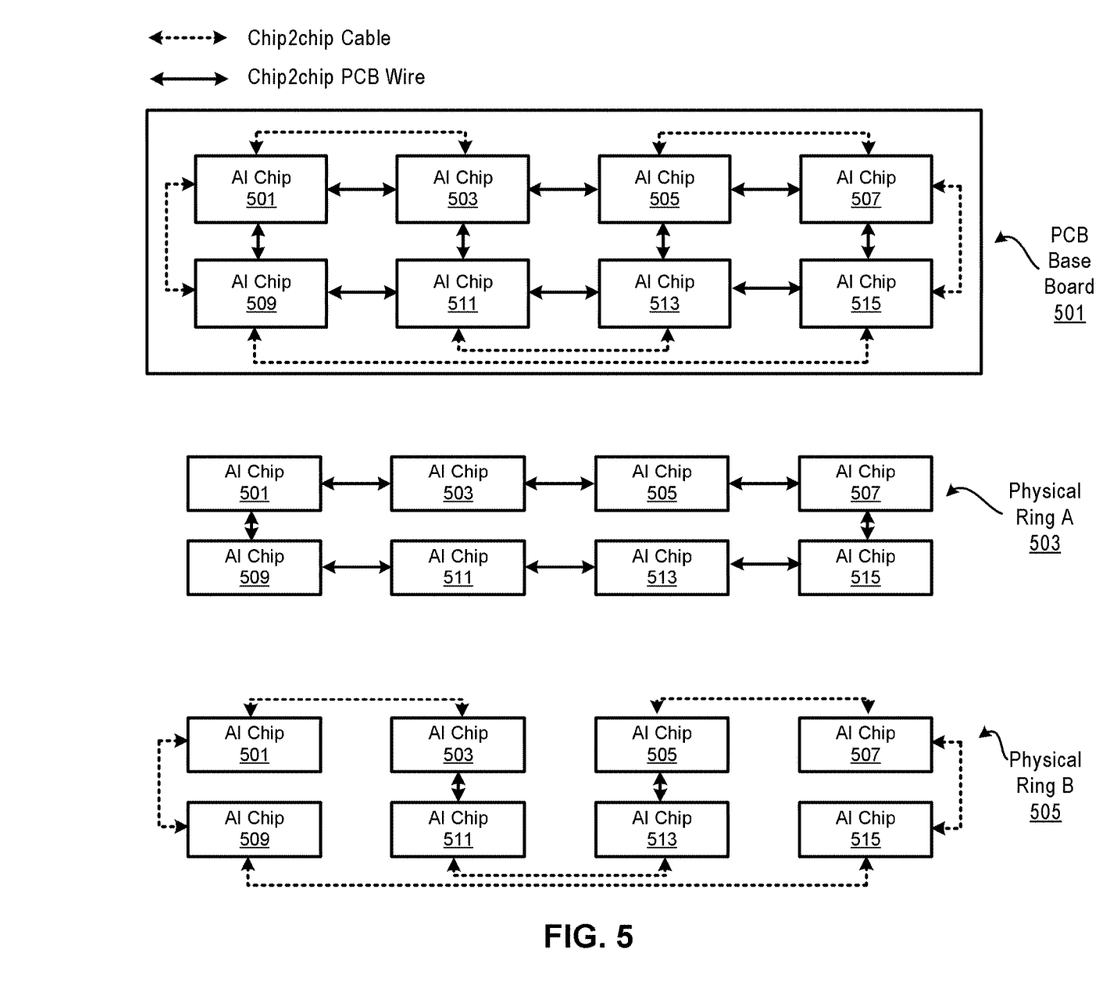
FIG. 5 illustrates an example PCB base board in accordance with an embodiment.

FIG. 5 illustrates an example PCB base board in accordance with an embodiment. As shown in FIG. 5, an PCB base board 501 can include an even number of AI chips (e.g., eight) 501-515, which are arranged in two rows, with each row having an equal number of AI chips. A pair of the AI chips can be connected through either a PCB wire, a cable connection, or both. For example, the AI chips 501 and 509 are connected using both a PCB wire and a cable connection, while the AI chips 503 and 505 are connected only using a PCB wire.

In one embodiment, AI chips on both ends of each row (e.g., AI chip 501, AI chip 507, AI chip 509, and AI chip 515) can each have two interconnect cable interfaces, while the rest of the AI chips each can have one interconnect cable interface.

The AI chips on the example PCB 501 can be configured into two bi-directional physical rings 503 and 505 for data exchanges in AI model training in an all-reduce algorithm. Since each physical ring is bi-directional, the two physical rings can operate as four logical rings.

In AI model training, particularly in some algorithms (e.g., all-reduce algorithm), a large number of rings (either physical or logical) means that a large number of training processes can be performed in parallel, thus speeding up the training of the AI model and reducing the total required training time.

With the AI chip layout and the mixed use of PCB wires and cable connections on the PCB base board 501, an AI chip topology created from multiple such PCB base boards can maximize the number of physical rings on the topology while maintaining the flexibility of creating topologies of different sizes without undue hardware overhead.

Figure 6:
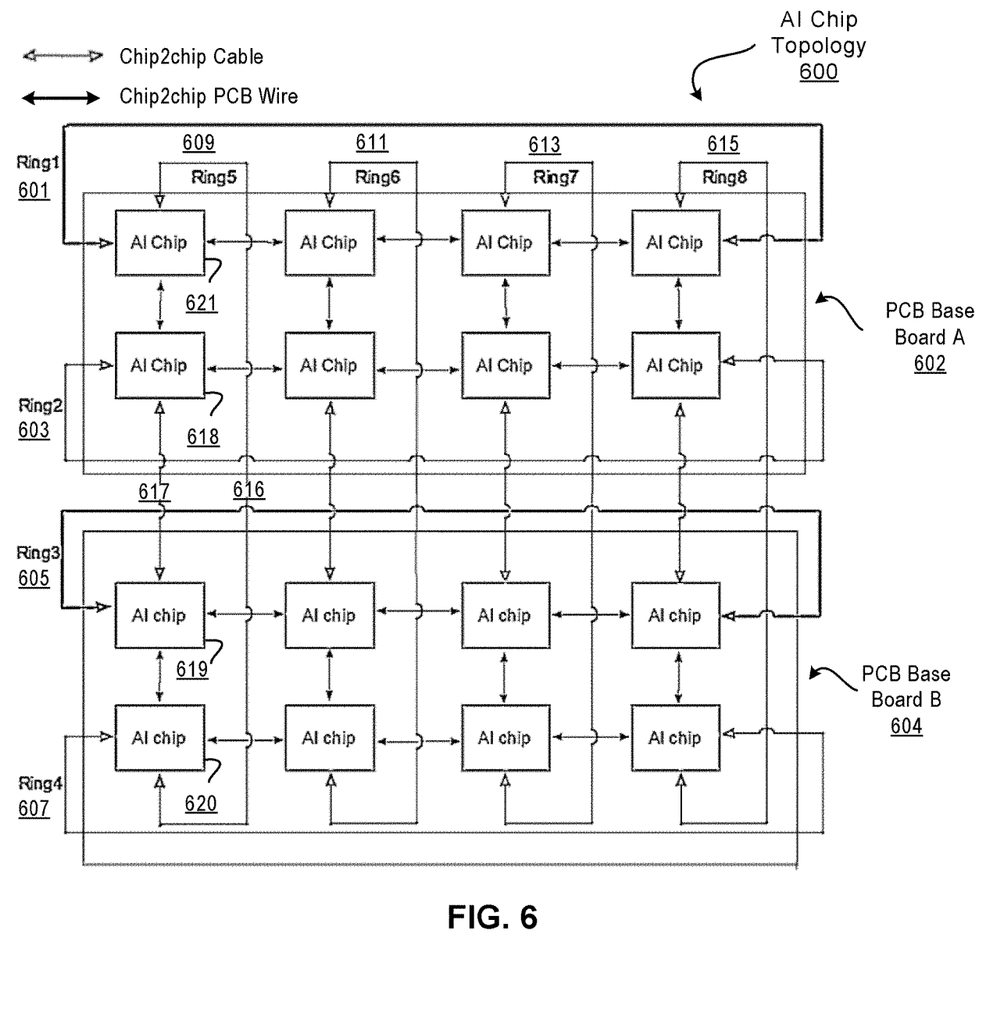
FIG. 6 illustrates an example AI chip topology 600 in accordance with an embodiment.

FIG. 6 illustrates an example AI chip topology 600 in accordance with an embodiment. As shown, the 16-chip topology is composed of two PCB base boards 602 and 604, each of which includes 8 AI chips arranged in two rows.

In one embodiment, when an AI chip topology includes a single PCB base board such as the one as described in FIG. 5, there can be 2 bi-directional physical rings as described in that figure. However, when more than one such PCB base boards are used to construct an AI chip topology, the way that physical rings are formed in the AI chip topology can be different, as shown in FIG. 6.

In FIG. 6, the topology 600, viewed as a whole, can include 4 columns and 4 rows. Each row can be connected using a number of PCB wires and a cable connection to create a bi-directional physical ring. The cable connection is used to connect the two AI chips on the ends of the row. Rings 601-607 illustrate the four physical rings created from the 4 rows of AI chips.

The four columns of AI chips in the topology 600 also form four separate physical rings 609, 611, 613, and 615. However, for each column, multiple cable connections are needed to create the physical ring. For example, for the physical ring 609, a first cable connection 617 is used to connect AI chips 618 and 619, and the second connection 616 is used to connect the two AI chips 620 and 621, which are on the ends of the row of AI chips.

The 16-chip topology 600, which can be built based on a mixed use of cable connections and PCB wires, can be expanded vertically to a larger topology (e.g., 64-chip or 128-chip) in one server rack as long as the power supply capacity of the server rack can support the topology. The 16-chip topology 600 can be expanded horizontally across, server racks alter a single server rack has reached its full capacity of power supply.

Figure 7:
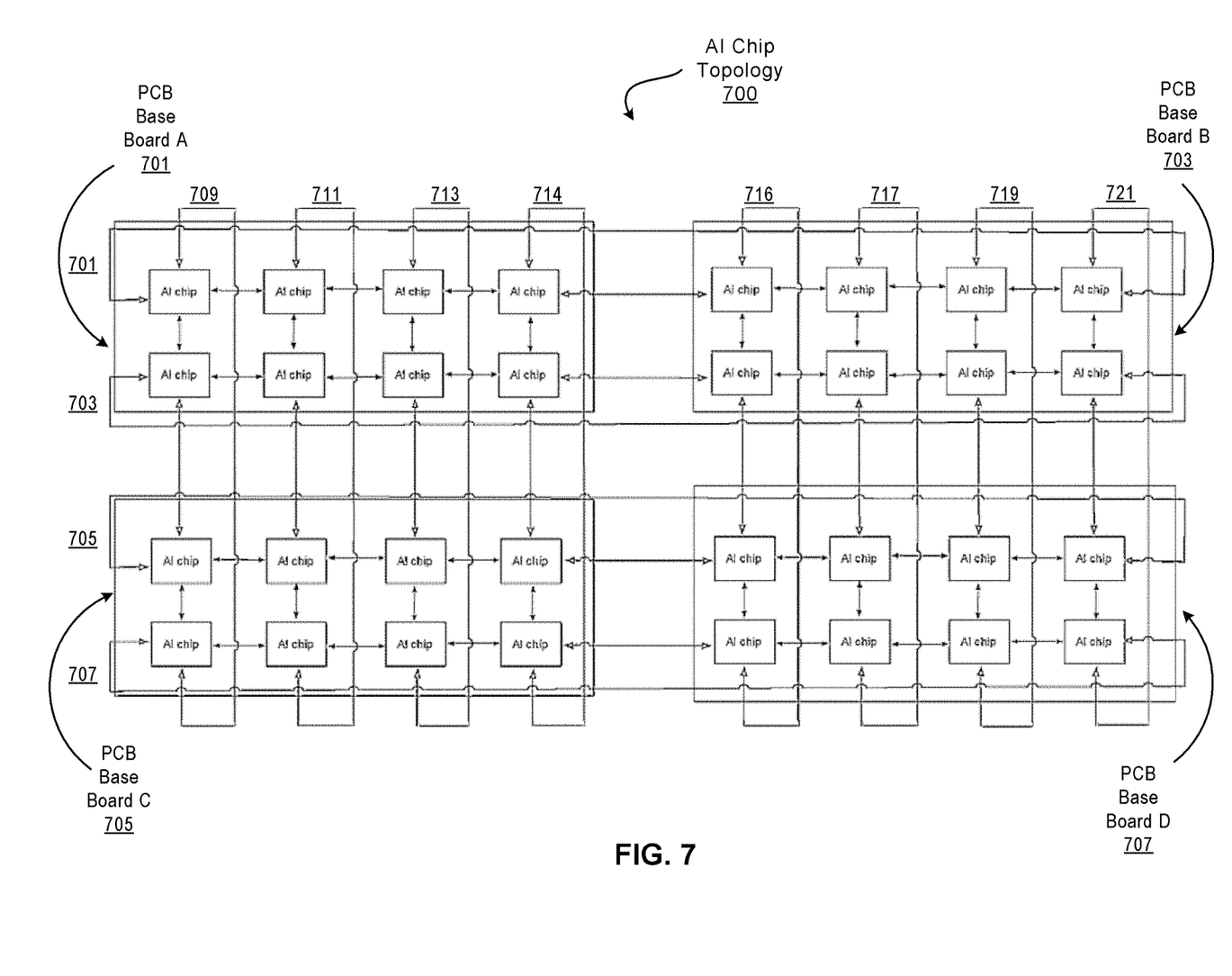
FIG. 7 illustrates an example process of AI model training in accordance with an embodiment.

FIG. 7 shows another example of an AI chip topology 700 in accordance with an embodiment. As described above, the size of an AI chip topology can be limited by the power supply capacity of a single server rack. To overcome the power supply limitation in one server rack, FIG. 7 shows a topology that connects AI chips across multiple server racks horizontally.

An AI chip topology 700 can include 4 PCB base boards 701, 703, 705 and 707 in different server racks. For example, PCB base boards 701 and 705 can be housed in a first server rack, and PCB base boards 703 and 707 can be housed in a second server rack. The number of PCB base boards in a server rack be increased up to the limits of the power supply capacity for that server rack. The chip topology 700 can also be further expanded horizontally by connecting to more server racks.

Figure 8:
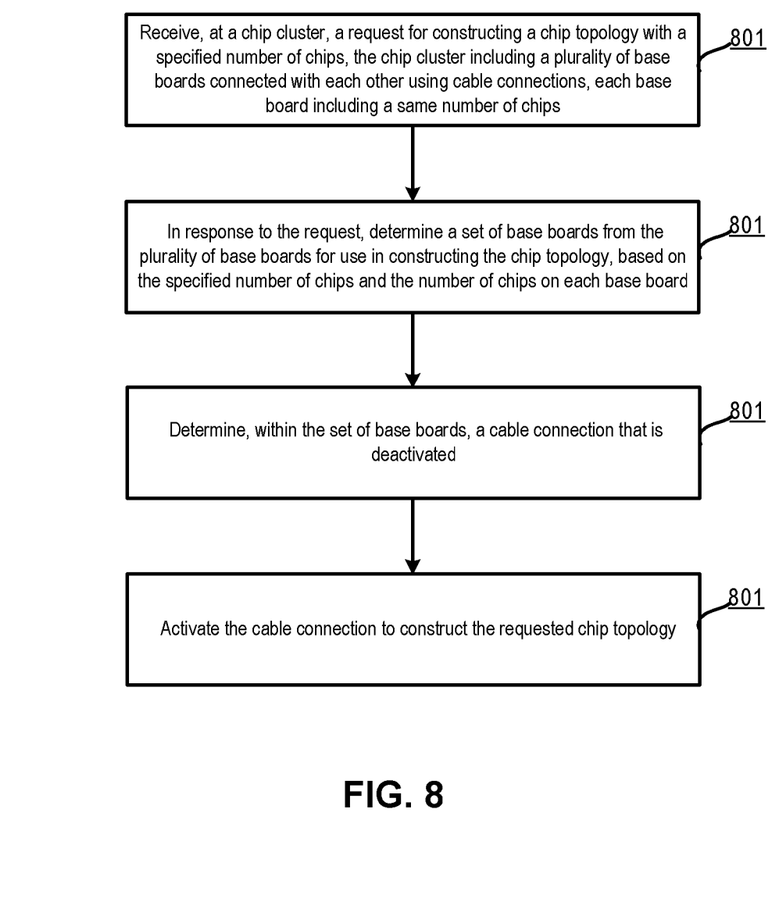
FIG. 8 illustrates an example process of creating AI chip topologies in accordance with an embodiment.

FIG. 8 illustrates an example process 800 of creating AI chip topologies in accordance with an embodiment. Process 800 may be performed by processing logic which may include software, hardware, or a combination thereof.

Referring to FIG. 8, in operation 801, processing logic receives a request for constructing a chip topology with a specified, number of chips in a chip cluster, the chip cluster including a number of base boards connected with each other using cable connections, each base board including a same number of chips. In operation 803, in response to the request, the processing logic determines a set of base boards from the plurality of base boards for use in constructing the chip topology, based on the specified number of chips and the number of chips on each base board. In operation 805, the processing logic determines, within the set of base boards, a cable connection that is deactivated. In operation 807, the processing logic activates the cable connection to construct the requested chip topology.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

All of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

The invention claimed is:

1. A data processing system, comprising:
a central processing unit (CPU); and
a plurality of accelerator cards coupled to the CPU over a bus, each of the accelerator cards having a plurality of data processing (DP) accelerators to receive DP tasks from the CPU and to perform the received DP tasks, wherein at least two of the accelerator cards are coupled to each other via an inter-card connection, wherein at least two of the DP accelerators are coupled to each other via an inter-chip connection, wherein each of the plurality of DP accelerators is in least two accelerator rings;

wherein each of the inter-card connection is capable of being dynamically activated or deactivated, such that in response to a request received from the CPU, any one of the accelerator cards can be enabled or disabled to process any one of the DP tasks received from the CPU.

2. The system of claim 1, wherein each of the DP accelerators of each of the accelerator cards includes a plurality of inter-chip interfaces, which can be utilized to interconnect with another one of the DP accelerators of the accelerator card via a respective inter-chip connection.

3. The system of claim 1, wherein each of the DP accelerators of each of the accelerator cards includes a plurality of inter-chip interfaces, which can be utilized to interconnect with another one DP accelerator of another accelerator card via a respective inter-card connection.

4. The system of claim 1, wherein the DP accelerators in each of the accelerator cards are arranged in a plurality of rows and columns coupled to each other via one or more inter-chip connections.

5. The system of claim 4, wherein each row of the DP accelerators of a first of the accelerator cards are coupled in series via respective horizontal inter-chip connections, forming a horizontal accelerator ring.

6. The system of claim 5, wherein each column of the first accelerator card is coupled to a corresponding column of a second of the accelerator cards via one or more respective inter-card connections, forming a vertical accelerator ring.

7. The system of claim 4, wherein each column of the DP accelerators of a first accelerator card are coupled in series via respective vertical inter-chip connections, forming a vertical accelerator ring.

8. The system of claim 7, wherein each row of the first accelerator card is coupled to a corresponding row of a second of the accelerator cards via one or more respective inter-card connections, forming a horizontal accelerator ring.

9. The system of claim 1, wherein each of the DP accelerators comprises an artificial intelligence (AI) accelerator chip.

10. The system of claim 1, wherein the bus comprises a peripheral component interconnect express (PCIe) link or an Ethernet connection, and wherein an inter-chip connection or an inter-card connection comprises a cache coherent interconnect for accelerators (CCIX) link.

11. An accelerator card, comprising:
a host interface to be coupled to a central processing unit (CPU) over a bus; and
a plurality of data processing (DP) accelerators to receive DP tasks from the CPU and to perform the received DP tasks, wherein at least two of the DP accelerators are coupled to each other via an inter-chip connection, wherein each of the plurality of DP accelerators is in least two accelerator rings;
wherein each inter-chip connection is capable of being dynamically activated or deactivated, such that in response to a request received from the CPU via the host interface, any one of the DP accelerators can be enabled or disabled to process any one of the DP tasks received from the CPU.

12. The accelerator card of claim 11, wherein each of the DP accelerators includes a plurality of inter-chip interfaces, which can be utilized to interconnect with another one of the DP accelerators via a respective inter-chip connection.

13. The accelerator card of claim 11, wherein each of the DP accelerators includes a plurality of inter-chip interfaces, which can be utilized to interconnect with another one DP accelerator of another accelerator card via a respective inter-card connection.

14. The accelerator card of claim 11, wherein the DP accelerators are arranged in a plurality of rows and columns coupled to each other via one or more inter-chip connections.

15. The accelerator card of claim 14, wherein the DP accelerators of each row are coupled in series via respective horizontal inter-chip connections, forming a horizontal accelerator ring.

16. The accelerator card of claim 15, wherein each column is coupled to a corresponding column of a second of the accelerator cards via one or more respective inter-card connections, forming a vertical accelerator ring.

17. The accelerator card of claim 14, wherein the DP accelerators of each column are coupled in series via respective vertical inter-chip connections, forming a vertical accelerator ring.

18. The accelerator card of claim 17, wherein each row is coupled to a corresponding row of a second of the accelerator cards via one or more respective inter-card connections, forming a horizontal accelerator ring.

19. The accelerator card of claim 11, wherein each of the DP accelerators comprises an artificial intelligence (AI) accelerator chip.

20. The accelerator card of claim 11, wherein the bus comprises a peripheral component interconnect express (PCIe) link or an Ethernet connection, and wherein an inter-chip connection or an inter-card connection comprises a cache coherent interconnect for accelerators (CCIX) link.

* * * * *